United States Patent Office 3,021,108
Patented Feb. 13, 1962

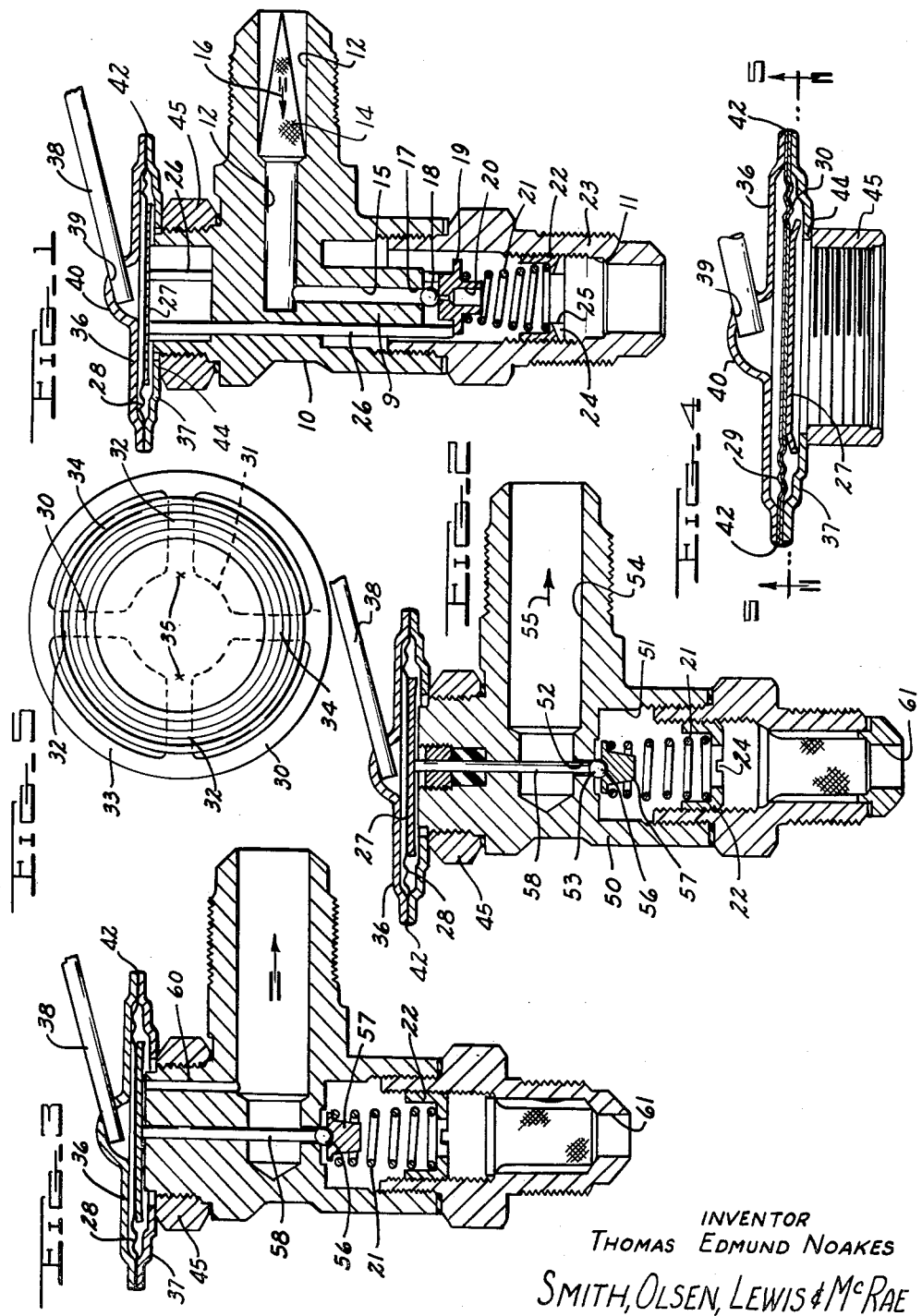

3,021,108
REFRIGERANT EXPANSION VALVES
Thomas Edmund Noakes, Detroit, Mich., assignor, by mesne assignments, to American Radiator & Standard Sanitary Corporation, New York, N.Y., a corporation of Delaware
Filed Apr. 12, 1957, Ser. No. 652,605
1 Claim. (Cl. 251—61)

This invention relates to refrigerant expansion valves useful in refrigerating and air conditionng equipment.

Objects of the invention are to provide a refrigerant expansion valve wherein:

(1) The valve is susceptible of manufacture as a low cost item;

(2) The valve component mechanisms can be precisely manufactured and assembled together so as to produce a valve having accurately predetermined operating characteristics;

(3) The valve includes adjusting structure for initial "superheat" calibration in accordance with the desires of the user;

(4) The valve can be manufactured as a relatively small size device so as to adapt it to use in closely confined locations;

(5) The valve includes a ball type port-closing element which is prevented from free uncontrolled "fluctuation" or "cocking" during operation, thereby resulting in an accurately controlled valve action, and (6) The valve includes a separable thermostatic actuation subassembly which can be easily removed in the field for replacement purposes.

Other objects of this invention will appear in the following description and appended claim, reference being had to the accompanying drawings forming a part of this specification wherein like reference characters designate corresponding parts in the several views.

In the drawings:

FIG. 1 is a sectional view through one embodiment of the invention,

FIG. 2 is a sectional view through a second embodiment of the invention,

FIG. 3 is a sectional view through a third embodiment of the invention,

FIG. 4 is an enlarged sectional view of a thermostatic actuation subassembly employed in the FIG. 1 through 3 embodiments, and FIG. 5 is a view substantially along line 5—5 in FIG. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 there is shown a refrigerant expansion valve including a forged brass housing 10 having a machined inlet passage 12 in which is mounted a strainer 14. Fluid flow is in the arrow 16 direction.

Housing 10 is provided with a machined outlet passage 15 which interconnects with passage 12 and defines a port 17. Portions of housing 10 are cut away to reduce the amount of metal surrounding passage 15, and annular wall portion 9 is made quite long. These features cause refrigerant expansion to have a minimum cooling effect on the thermostatic fluid above diaphragm 28. A port-closing ball 13 of hardened steel is projection welded onto a steel spring retainer 19 which is bored out at 20 to enable one of the welding electrodes to be positioned adjacent the lower surface of the ball (prior to insertion of the elements 18 and 19 into housing 10). The welding of ball 18 onto retainer 19 prevents any uncontrolled cocking or fluctuation of the ball such as causes erratic valve operation. A compression spring 21 is seated between retainer 19 and a nut 22 which is adjustably threaded in a tubular connector member 23. The lower end of member 23 is adapted to connect to conventional refrigerant tubing (not shown and for this purpose the end surface of member 23 is given a generally frusto conical configuration so as to mate with the tubing). Nut 22 is provided with a screw driver slot 24 for "superheat" adjustment and a central aperture 25 for permitting fluid flow through outlet 11.

In order to move ball 18 away from port 17 there are provided three slidable push rods 26, only two of which are visible in FIG. 1. Rods 26 are positioned between retainer 19 and a pressure pad 27 which is spot welded at 35 onto a diaphragm 28.

Diaphragm 28 comprises a thin metal sheet 29 and thin metal spider element 30 which serves to accurately locate the diaphragm centrally on pad 27. Element 30 includes a central section 31, four radiating arm sections 32, and a rim section 33. Sheet 29 and spider element 30 are provided with mating annular corrugations 34.

The rim portions of sheet 29 and spider 30 are clamped between the rims of two disks 36 and 37, which constitute a casing for volatile thermostatic fluid introduced from a "feeler" coil (not shown) through capillary tube 38. Securement of disks 36, 37 and diaphragm 28 is effected by a continuous annular weld 42. Sheet 29 and spider 30 are each about .005 inch in thickness, while disks 36 and 37 are each about .045 inch in thickness. Because diaphragm 28 is relatively thin it loses heat more rapidly than disks 36, 37. Accordingly, if diaphragm 28 and disks 36, 37 were formed of the same material there would be a radial movement of disks 36 and 37 relative to diaphragm 28 during the welding operation at 42. Such a radial movement would set up permanent stresses in diaphragm 28 which would alter its "flexing" characteristics and change the magnitude of its response to volumetric change of the thermostatic fluid. To alleviate this condition diaphragm 28 is constructed of a material having a higher coefficient of expansion than the material for disks 36 and 37. For example, elements 29 and 30 may be formed of type 347 stainless steel, and disks 36 and 37 may be formed of type 443 stainless steel. The use of different materials for diaphragm 28 and disks 36 and 37 causes them to expand and contract approximately equal amounts during the welding operation so as to allow the diaphragm to retain its initial "flexing" characteristics after the welding operation. The diaphragm and pressure pad 27 are positioned very close to the interior surface of disks 36 and 37 in such manner as to limit diaphragm flexing and prevent "overcenter" diaphragm action.

Tube 38 extends through an opening 39 in a semispherical section 40 of disk 36. Opening 39 is formed as a circular opening while disk 36 is in the "flat" condition. After formation of semi-spherical section 40 tube 38 is extended through opening 39 at an angle of about fifteen degrees to the disk plane and soldered in place. The position of opening 39 and its method of formation gives it a tight fit on tube 38 so as to insure a tightly sealed soldered joint.

Prior to its assembly with disk 36 lower disk 37 is projection welded at 44 onto a mounting nut 45. Thus, the assembly of nut 45, disks 36, 37, tube 38 and feeler coil (not shown) can be formed prior to installation on housing 10. As a result this assembly can later be removed and replaced in the field by relatively inexperienced personnel.

The operation of the valve is such that changes in temperature of the fluid within the feeler coil cause the thermostatic fluid to undergo volumetric change so as to flex diaphragm 28 between positions limited by disks 36 and 37. This diaphragm flexing is transmitted through push rods 26 to ball 18 so as to open and close port 17 for control of refrigerant flow into outlet 11.

The FIG. 2 construction includes a forged brass housing 50 having a machined inlet passage 51 which cooperates with a second machined passage 52 to define a port 53. A right angularly directed passage 54 interconnects with passages 52 to allow fluid flow in the arrow 55 direction.

Port 53 is releasably closed by a ball 56 which is seated on a spring retainer 57. Ball 56 is welded onto the lower end of a push rod 58 which extends upwardly into pressure engagement with pressure pad 27 of the previously described thermostatic power element assembly shown in FIG. 4. The welded connection between ball 56 and rod 58 ensures that ball 56 will always be under the control of diaphragm 28 without any free uncontrolled fluctuation. The welding is performed before assembly of rod 58 into housing 50. As a result no application of heat takes place after installation of spring 21 such as might alter the temper of the spring and thereby alter the spring characteristics. In many prior art constructions soldering or welding operations are necessary after installation of the spring; these operations tend to alter the spring force so as to destroy the valve superheat calibration.

The FIG. 3 construction is similar to the FIG. 2 construction except for the presence of a "pressure equalization" passage 60, the FIG. 3 construction being known in the art as an "internally equalized" valve.

In both the FIG. 2 and FIG. 3 constructions refrigerant enters through inlet 61 and flows through port 53 and passage 52 into the outlet passage 54. Fluid flow is controlled by ball 56 under the influence of the thermostatic fluid above diaphragm 28.

Each of the three illustrated embodiments is a relatively simple structure which can be manufactured in small sizes as a low cost item. The valve housings require minimum machining, and yet no separate inserts are required. The various components, such as the FIG. 4 assembly and the ball 56-rod 58 assembly, are susceptible of precise manufacture and positioning so as to provide a valve having accurately controlled operating characteristics.

I claim:

An expansion valve comprising a housing internally contoured to define an inlet passage, an outlet passage, and a port therebetween; a port-closing element seatable against said port; a casing for pressure fluid positioned on the housing in axial alignment with said port; said casing comprising two relatively flat disks of substantial thickness and rigidity having their rims offset toward one another; a relatively thin flexible metal diaphragm having its rim positioned between the disk rims; a weld around the edges of said rims; and push-rod means between the diaphragm and port-closing element for transmitting diaphragm movement into movement of the port-closing element; the material for the diaphragm having a sufficiently greater coefficient of heat expansion than the disk material such that during the welding operation the diaphragm expands and contracts with the disk with little relative movement therebetween.

References Cited in the file of this patent

UNITED STATES PATENTS

| 2,282,413 | Zoder | May 12, 1942 |
| 2,299,778 | Wissler | Oct. 27, 1942 |
| 2,363,010 | Matteson | Nov. 21, 1944 |
| 2,392,943 | Persons | Jan. 15, 1946 |
| 2,399,088 | Andrews | Apr. 23, 1946 |
| 2,523,906 | Holmes | Sept. 26, 1950 |
| 2,594,701 | Wolf | Apr. 29, 1952 |
| 2,701,451 | Candor | Feb. 8, 1955 |
| 2,771,248 | Ehlke | Nov. 20, 1956 |
| 2,786,336 | Lange | Mar. 26, 1957 |
| 2,949,128 | Carter | Aug. 16, 1960 |

FOREIGN PATENTS

| 63,533 | Germany | July 27, 1892 |
| 504,905 | Belgium | Aug. 14, 1951 |